United States Patent
Miettinen et al.

(10) Patent No.: US 7,020,778 B1
(45) Date of Patent: Mar. 28, 2006

(54) METHOD FOR ISSUING AN ELECTRONIC IDENTITY

(75) Inventors: Jarmo Miettinen, Espoo (FI); Atte Lahtiranta, Espoo (FI); Saku Salo, Helsinki (FI); Jari Otranen, Vantaa (FI); Jukka Liukkonen, Helsinki (FI); Mikko Mättö, Espoo (FI); Jennifer Saarinen, Espoo (FI)

(73) Assignee: Sonera Smarttrust Oy, Sonera (FI)

( * ) Notice: Subject to any disclaimer, the term of this patent is extended or adjusted under 35 U.S.C. 154(b) by 0 days.

(21) Appl. No.: 09/489,328

(22) Filed: Jan. 21, 2000

(51) Int. Cl.
*H04K 1/00* (2006.01)

(52) U.S. Cl. ............... 713/182; 713/155; 713/156; 713/157; 726/1; 726/2; 726/4; 726/5; 726/18; 379/93.02

(58) Field of Classification Search ............... 713/182
See application file for complete search history.

(56) References Cited

U.S. PATENT DOCUMENTS

| | | | | |
|---|---|---|---|---|
| 5,241,599 A | * | 8/1993 | Bellovin et al. ............ | 713/171 |
| 5,745,574 A | * | 4/1998 | Muftic ........................ | 713/157 |
| 5,790,674 A | * | 8/1998 | Houvener et al. .......... | 713/185 |
| 5,799,086 A | * | 8/1998 | Sudia .......................... | 705/76 |
| 6,028,938 A | * | 2/2000 | Malkin et al. .............. | 713/176 |
| 6,167,518 A | * | 12/2000 | Padgett et al. .............. | 713/186 |
| 6,263,446 B1 | * | 7/2001 | Kausik et al. ............... | 713/201 |
| 6,327,578 B1 | * | 12/2001 | Linehan ....................... | 705/65 |
| 6,367,013 B1 | * | 4/2002 | Bisbee et al. ............... | 713/178 |
| 6,496,851 B1 | * | 12/2002 | Morris et al. ............... | 709/204 |

\* cited by examiner

*Primary Examiner*—Ayaz Sheikh
*Assistant Examiner*—Syed A. Zia
(74) *Attorney, Agent, or Firm*—Cohen, Pontani, Lieberman & Pavane

(57) ABSTRACT

A method for issuing an electronic identity based on previously certified electronic identity. This is accomplished by providing a method to use a previously certified identity to create another representational form for the same identity. This way the holder of a certificate can extend his or her already verified identity for other uses. The previously certified identity can be for instance so called mobile identity which is associated to a person's mobile terminal such as mobile phone. The person can show to certificate be his/her own by using the digital signature feature of the mobile terminal.

26 Claims, 2 Drawing Sheets

METHOD FOR ISSUING AN ELECTRONIC IDENTITY

BACKGROUND OF THE INVENTION

1. Field of the Invention

The present invention relates to electronic identity techniques and methods. More particularly the present invention relates to a novel and improved method and system for requesting and issuing an electronic identity based on previously certified electronic identity.

2. Description of the Prior Art

With respect to securing communication, entities are often required to electronically authenticate themselves before utilizing services or executing transactions. This authenticity may come in the form of a username and password combination or a certificates. To accomplish this feat, these entities must first register their existence either physically or virtually so that they might receive a proof of identity.

Providing the proof, such as a username and password combination, carries out the actual authentication. Aforementioned simple authentication schemes are unfortunately quite context specific: identity based on username and password may be totally insignificant in all other circumstances. Moreover, such proof does not irrefutably distinguish different entities.

Digital certificates or electronic identities are electronic files that are used to uniquely identify people and resources over networks such as the Internet. With help of digital certificates it is possible to make secure, confidential communication between two parties. When one travels to another country, his/her passport provides a universal way to establish your identity and gain entry. Digital certificates provide similar identification. Certificates may be issued by a trusted third party (TTP) such as a Certification Authority (CA). Much like the role of the passport office, the role of the trusted third party is to validate the certificate holders' identity and to "sign" the certificate so that it cannot be forged or tampered with. Once a TTP has signed a certificate, the holder can present their certificate to people, Web sites, and network resources to prove their identity and establish encrypted, confidential communications.

A certificate typically includes a variety of information pertaining to its owner and to the TTP that issued it. This information can be as follows. The name of the holder and other identification information required to uniquely identify the holder, such as the URL of the Web server using the certificate, an individual's email address or the holder's public key. The public key can be used to encrypt sensitive information for the certificate holder; the name of the Certification Authority that issued the certificate; a unique identifier; the validity period (or lifetime) of the certificate (a start and an end date).

In creating the certificate, this information is digitally signed by the issuing TTP. The TTP's signature on the certificate is like a tamper-detection seal on a bottle of pills—any tampering with the contents is easily detected. Digital certificates are usually based on public-key cryptography, which uses a pair of keys for encryption and decryption. With public-key cryptography, keys work in pairs of matched public and "private" keys. In cryptographic systems, the term key refers to a numerical value used by an algorithm to alter information, making that information secure and visible only to individuals who have the corresponding key to recover the information.

The public key can be freely distributed without compromising the private key, which must be kept secret by its owner. Since these keys only work as a pair, an operation (for example encryption) done with the public key can only be undone (decrypted) with the corresponding private key, and vice-versa. A digital certificate securely binds your identity, as verified by a trusted third parry (a CA), with your public key.

A CA certificate is a certificate that identifies a Certification Authority. CA certificates are just like other digital certificates except that they are self-signed. CA certificates are used to determine whether to trust certificates issued by the CA.

In the case of a passport, a passport control officer will verify the validity and authenticity of your passport and determine whether to permit you entry. Similarly, the CA certificate is used to authenticate and validate the Web server certificate. When a Web server certificate is presented to a browser, the browser uses the CA certificate to determine whether to trust the Web server's certificate. If the server certificate is valid, the secure session proceeds. If the server certificate is not valid, the server certificate is rejected and the secure session is stopped.

In digital environment the contemporary equivalent of an identity card is a certificate: a confirmed proof of an entity's distinct identity. A certificate typically does more than just confirms attributes of its subject. The most common use of (public key) certificates is to bind an entity's public keys to its identity. These keys can be used to various purposes such as providing authentication, authorization, confidentiality, integrity, or non-repudiation.

Theoretically certificates are not context specific but in practice different uses require different certificates. E.g. standard X.509 certificate does not include e-mail address information that is required in secure electronic mail (e.g. electronic mail encrypted using Pretty Good Privacy® (PGP®) or Secure Multipurpose Internet Mail Extensions (S/MIME) techniques). Similarly other applications may need to have their own proprietary attributes included in certificates. Although this inclusion of attributes is not problematic per se, new certificates need to be created.

U.S. Pat. No. 5,982,898 describes a method for issuing a short term certificate for a person who already has a previous certificate. The new certificate is issued after the validation process of the ownership of the previous certificate. The validation is done by separating the casks of identity verification and certificate issuing, which allows a disassociating of the long-term binding between the person and his/her public/private key pair. This is accomplished by a registration authority issuing a password to the person once it is satisfied of person's bona fide. Thereafter, whenever the person wishes to have a new certificate or electronic identity, the person contacts a certification authority, identifies itself with the password and obtains a certificate. The certificate typically includes person's name and a public key in plaintext, and a signature. The signature is derived by hashing the plaintext portion of the certificate to obtain a value, and encrypting the value with the CA's private key.

In order to get a certificate or some other electronic proof of identity a subject must prove and register its existence to some authority. If the same identity needs several proofs for different uses, this repeated registration procedure would become quite inconvenient.

SUMMARY OF THE INVENTION

The purpose of this invention is to provide means to use a previously certified identity to create another representational form for the same identity. This representational for can be expressed as an electronic identity, a certificate, or a certificated access to a service or a server. This way an entity, that can be defined as a recipient of a electronic identity or a certificate or a holder of a certificate, can extend his, her or its already verified identity for other uses. The previously certified identity can be for instance so called mobile identity which is associated to a person's mobile terminal such as mobile phone. The person can show to certificate be his/her own by using the digital signature feature of the mobile terminal.

In the following is an example of the steps or the identity extension process according to the present invention. Note that the entities and devices in the process description are listed by their role and may not be distinct ones in practical implementations.

An entity needs to be authenticated in a context where it does not have a previously confirmed identity. The entity or authorized representative supplies optional information that is appended to verified facts provided by registration authority chat knows the entity's mobile identity.

This information and an identification request is sent to the mobile identity registration authority with routing info to the receiver of identification and also to the terminal equipment that contains the means, i.e. signing keys to prove the previously confirmed mobile identity. Based on identification request type registration authority appends optional sender-supplied attributes to verified data that it possesses and forwards these to the specified terminal equipment. If the identity cannot be resolved from the terminal routing info, the process terminates.

The entity or authorized representative inspects the accuracy of identification response information on the terminal equipment and if he, she, or it is satisfied with it, digitally signs the response after which it is sent back to registration authority. If identification type requires additional guarantees, e.g. certification, registration authority acquires appropriate confirmation from providers of those services. Confirmed identity information is sent to the receiver address specified in the original identification request.

Compared to previous registration and certification schemes the most obvious benefit is that the present invention offers the same amount of trust that a local registration office is capable of providing without its physical and other constraints. The equivalence of trust holds on condition that the registration authority possesses or has access to corresponding information, i.e. its private databases or databases of other authorities such as Finnish Population Registry Center. On the other hand there are also attributes, such as access to a certain e-mail address, that can be confirmed by virtual means even if these are not recorded in advance.

If mobile identity and equipment is used instead of e.g. a terminal equipped with a smart card reader, the solution of the present invention is totally location independent. An entity can confirm its identity and acquire a new identity whenever and wherever it is required and is not constrained by the available hardware and software provided that the recipient is capable of receiving the affirmation. Although the solution does not disallow the use of public mobile terminals (i.e. somebody else's phone), most likely the terminal that is used in authorizing the identification response is an entity's own. Consequently an entity is not required to perform sensitive operations, such as entering a signing PIN, on distrusted devices.

Essentially the invention is intended for extending an entity's identity based on an existing mobile certificate and other verified and confirmed facts. The one of the most apparent and practical functions is to use this information to issue new certificates for various security/encryption uses such as secure e-mail, PGP® or S/MIME. The mobile variant of the solution, however, does not have to be as limited. Since the ability to provide confirmed facts about an entity is totally mobile, in certain situations certificates are not a key issue. Say, if mobile identity registration authority has access to Finnish Population Registry Center's database it can provide confirmed home address, marital status, or whatever is required.

BRIEF DESCRIPTION OF THE DRAWINGS

The features, objects, and advantages of the present invention will become more apparent from the detailed description set forth below when taken in conjunction with the drawings wherein.

DETAILED DESCRIPTION OF THE PREFERRED EMBODIMENTS

Figure 1:
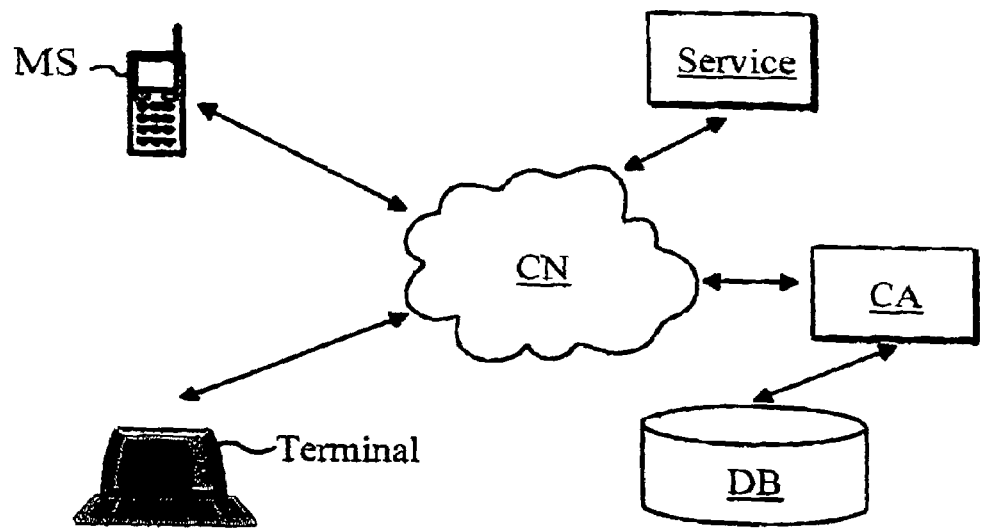
FIG. 1 is a block diagram of a system of the present invention.

FIG. 1 presents one example of the preferred system according to the present invention. The system of FIG. 1 includes mobile station MS which is connected through the communication network CN to the Certificate Authority CA server. Also the system includes a terminal including for instance a web browser. The terminal is connected through the communication network CN to the server of CA. The mobile station contains means for digital signing a message or character string. Digital signing means are certified with at least one certificate which enables the user to authenticate more certificates. This previous certificate can be a mobile certificate which is mentioned above.

Referring further to FIG. 1 it is described one preferred solution of the present invention. This solution is described in the context of certifying a new PGP® key pair.

In this solution the following assumptions are made. The mobile phone's Security Identity Module (SIM) card-signed PGP® key packet only "lives" for a short time (a few minutes) in the system and is then thrown away. If it is logged it can be used for journalizing the transactions in the issuing process. Also it can be logged perhaps for keeping track of errors. If there were to be any permanent retention of this packet (for legal or other purposes), it would have to comply with some existing standard format, in order to be assured that it could be accessed and correctly interpreted in the future.

As described here, the format of the phone-signed PGP® key packet does not fit any existing standard. If necessary, a standard format could be designed, and the SIM card software would be required to create signatures in this format. The user has control (physical security) of the PC and corresponding PGP® private key used for performing the operations described here. The CA operates a publicly accessible PGP® keyserver containing all of the PGP® keys that the CA has signed.

Here we describe the steps to follow in order to use the applicants S3 system to securely sign a PGP® key by the WPKI CA (WPKI, Wireless public key infrastructure), using a user's S3 SIM card to link the signature back to the proof of identity that was presented to the WPKI Local Registration Authority. This process is performed without breaching the anonymity of the user's SIM card Network ID (NID). As described here, the process is stateless on the CA end, reducing complexity and increasing resiliency of the protocol for the CA.

At first software using PGP® on the PC displays the name and PGP® key fingerprint of the user that is to be certified on the PC screen. Also displayed on the PC display is a prompt to enter the 4 digit number on the mobile phone display.

The PGP® key fingerprint is a cryptographically strong hash of the key. PGP® users are accustomed to verifying keys by comparing key fingerprints so this makes it easier to verify the link between the PC and the Phone is reliable, and not being attacked by an intruder inserting a take message to be signed by the phone. The latter is probably not necessary to protect against, since we assume physical security for that link. However, the link is not necessarily secured.

The PC software communicates with the phone through the wired or wireless interface or other appropriate interface, and passes a message packet containing a command to start the PGP® key signing process. Phone generates and displays a four digit random number, along with a prompt to type this number into the PC if the user wants to sign his PGP® key with his phone key.

The phone displays a 4 digit random number that then must be manually entered into the PC's keyboard. This prevents a daring (high probability of detection) attack from a hostile device that might be communicating with the phone, and trying to trick it into signing a "What is my name?" message that could be used to compromise the NID's anonymnity.

Then user types in the 4 digit number from the display on the phone into the PC, as requested by the screen prompt.

On the PC, the software cakes the 4 digit random number entered by the user, and sends it with a message, intended to be sent to the CA, requesting (from the CA) a User ID lookup for a phone NID that signed the request. In other words, a "What is my name?" request.

The phone compares the random number sent with the "What is my name?" request, and if it matches, displays a warning that it is about to sign a PGP® key with its key.

PC displays a lengthy legal notice to user warning that user is about to sign their PGP® key with the phone's key and that the user is contractually obligated to only make this signature if he is the owner of both keys. Again, if the random number matched, the "What is my name?" message is signed by the phone, returned to the PC through the serial interface, and saved for transmission to the CA. The PC software generates another message, intended for transmission to the CA, this message contains the key fingerprint, and a request to the CA to sign the attached key, if the fingerprint matches. This is a "Sign this User ID and key, please." request. The "Sign this User ID and key, please." message is then passed to the phone through the serial interface, with a request that the phone sign the packet, using the its SIM card private key.

The PGP® key fingerprint is displayed on the phone at this point and verified, by the user to be in agreement with the PGP® key fingerprint on the PC screen. The user is prompted to OK the signature, if the fingerprint matches. The User's phone sends the signed "Sign this User ID and key, please." packet back through the serial interface to the PC (along with the phone key ID that signed it). Save on the PC for later transmission to the CA. The connection between the PC and the phone is no longer needed after this point, and is dropped.

Note that if desired, the process described in the preceding few steps could be accomplished with only one signed message from the phone. This message would contain a signature of the PGP® key fingerprint. The one message would be used with two different meanings, first to ask the CA, "What's my User ID (name)?", and second to command it to "Sign this Key and User ID please". In the first case the PGP® key fingerprint is ignored, since only the phone's NID is need to specify what name is desired from the CA.

The PC opens up a secure channel (using Transport Layer Security (TLS)) to the Certification Authority. The PC sends the SIM signed request for User ID ("What's my User ID and name?") query to the CA over the secure link.

The CA looks up the phone's owner in the confidential database, and sends the User ID for the phone back to the PC, as requested. This is the WPKI User ID that the phone's owner had certified at the Local Registration Authority (LRA). Sending this information to the PC does not breach the anonymity of the NID, since the link is encrypted and the phone owner is the one making the request.

The PC checks to see if the returned WPKI User ID is present on the users PGP® key. If it is, then the process proceeds to the next step, automatically. If the returned WPKI User ID is not present on the PGP® key, then the User ID is added to the PGP® key before proceeding.

If the WPKI User ID must be added to the PGP® key, we branch off at this point and follow the normal PGP® procedure for adding a new User ID to one's key-ring. The user must supply an email address for this User ID, because the User ID supplied by the CA wall not have an email address.

Since the ultimate result of this process will be publication of the signed key on a public keyserver, the User ID must be self-signed. PGP® User IDs are only suitable for publication it they are signed by the key's owner.

The PC next uses the user's PGP® private key to sign the "Sign this key, please." request to the CA (this request is asking the CA to sign the phone owner's PGP® key, remember). This request was signed earlier by the phone's SIM card.

This signature shows the CA that the requestor is the one who controls the PGP private key component, and is not sending someone else's key for certification.

The PC sends the PGP® and Phone signed "Sign this User ID and Key, Please." request packet with the corresponding PGP® key up to the CA, through the established TLS link. Again, this packet links the phone owner's (presumably anonymous) NID with the public PGP® identity, so the channel must be encrypted.

The CA checks the PGP signature. The CA checks the phone key. The CA then checks in its confidential database for the User ID associated with the phone that signed the "Sign this Key, Please." request. The submitted PGP User ID (name portion) must match with the CA's phone's user name. This will be the case, because we just added the User ID returned by the CA for this NID to the PGP key we attached to the message.

If the submitted User ID for this phone is not found in the CA's confidential database, the request is denied, and an error message is sent back to the PC. For debugging purposes, this error message could contain the correct User ID, since we are operating over an encrypted channel. The user is informed of the problem via an error message displayed on PC. If the name portion of the user IDs match, then the CA signs the PGP® key with the CA key and discards the "Sign this key, Please" request with the phone NID. It then inserts this information into the confidential database. The CA-signed PGP® key is added to a "Pending PGP® Certificate" database on the CA.

The CA then emails the CA-signed PGP Key to the email address specified by the user in the User ID that was signed by the CA. This provides a check that the email address is correct. This certificate is encrypted by the public encryption key of that user. That way if the email address turns out to be wrong, and the key is misrouted, it will likely never be decrypted by anyone.

The CA expects the user to decrypt and re-upload the signed key back up to the CA, thus proving that the email address was correct, and the person residing at that email address has the capability of decrypting with that key. When the CA receives this key back from the user, the CA purges it from the Pending PGP® Certificate database. To overcome email delivery problems, periodically the CA will repeat the previous step until the user responds or until the CA decides to give up.

When the CA receives this key back from the user, the CA publishes the resultant signed PGP® key on its PGP® key server. The PGP® key is signed only with the LRA-verified User ID, of course. None of the other UserIDs that the user might have on his PGP® key are signed by the CA. Note also that the telephone NID is not part of the PGP® key, nor is it published with the PGP® key, so we are still protecting the user's NID-related anonymity.

Figure 2:
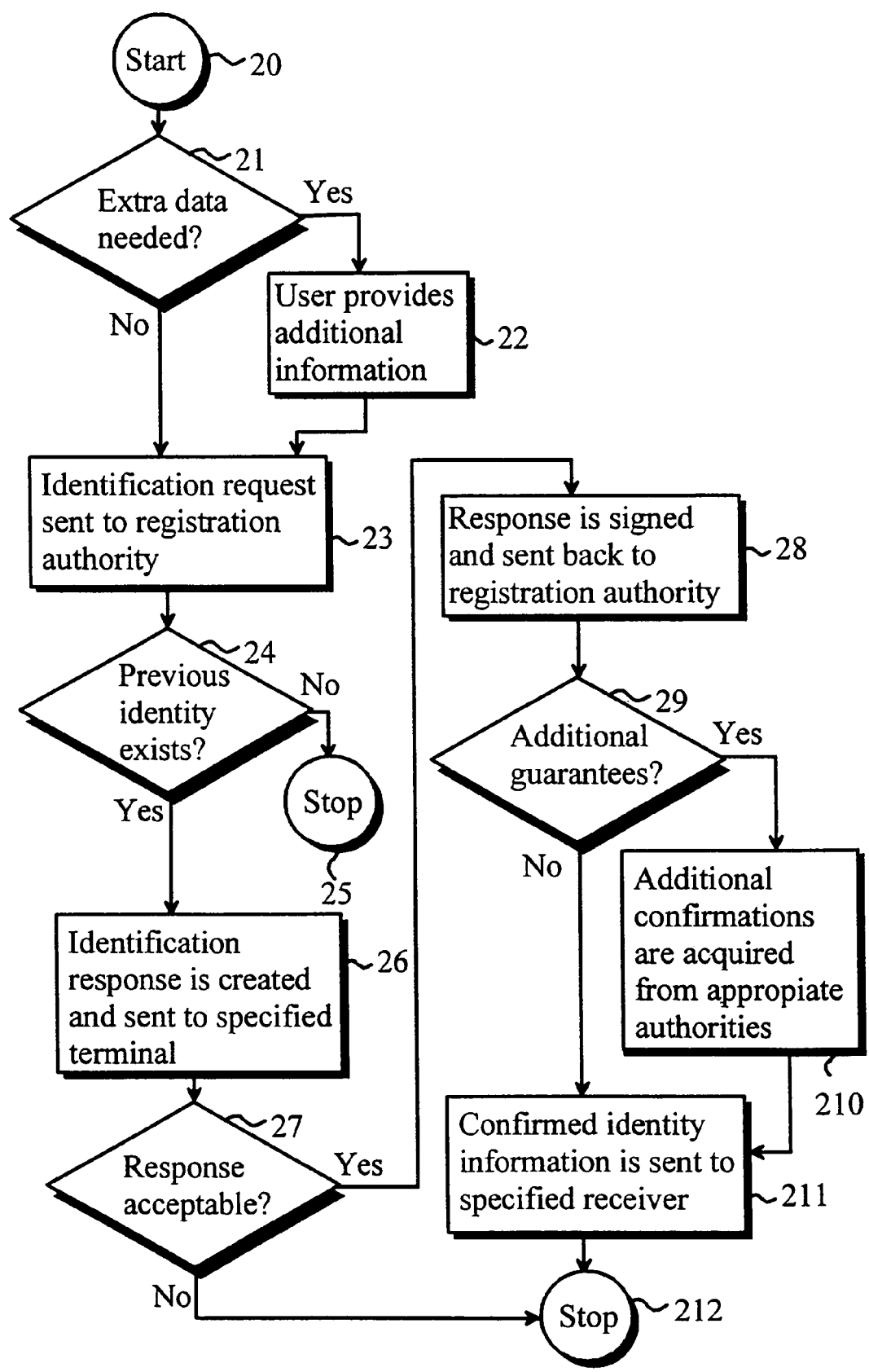
FIG. 2 is a flow diagram in accordance with one embodiment of the invention.

FIG. 2 presents one example of the flowchart of the present invention. First the need for any additional data is checked, state 21. The additional data can be user's current and previously issued certificate or some other information like the name or the e-mail address of the user. If any additional information is needed then the user will provide it, state 22. Then the request for identification is sent to the registration authority CA, state 23. According the identity information the existence of any previous identities is searched, state 24. This search can be made in the private databases of the registration authority or databases of other authorities. If any previous identities is found then a response is created and sent to specified terminal, state 26. If any previous identities is not found then the information needed is acquired from the user. If the user accepts the response he or she signs it digitally and sends it back to registration authority, states 27 and 28. If any additional guarantees are required then those can be acquired from appropriate authorities, states 29 and 210. Finally the confirmed identity information is sent to specified receiver, state 211.

Figure 3:
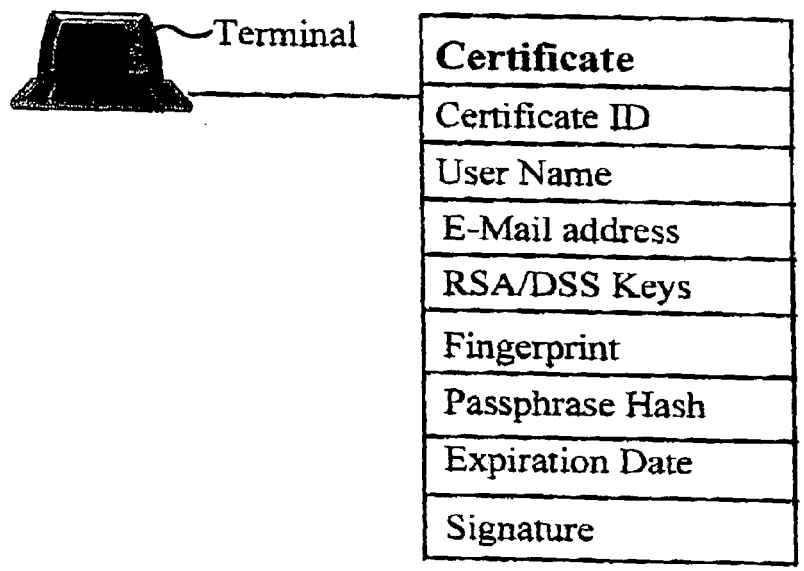
FIG. 3 is a second flow diagram in accordance with one embodiment of the invention

FIG. 3 presents one example of the certificate of the present invention. The certificate contains a number of information, which are required for the identification. Typically such information are certificate identification number, user name, users e-mail address, RSA/Digital Signature Scheme (RSA/DSS) keys, the fingerprint of the signature or of the certificate itself, the hash of the passphrase, the signature, and the expiration date of the certificate.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. Method for issuing an electronic identity for a first entity from an identity registration authority, the method comprising the steps of:
   a) issuing a first electronic identity for said first entity, said first electronic identity having a first representational form for use by said first entity in a first application;
   b) creating a request for a second electronic identity for use by said first entity in a second application, the request including an identifier of said first entity, said second application requiring said second electronic identity in a second representational form that is different from said first representational form;
   c) sending said request to said identity registration authority;
   d) in response to said request, creating an identification response;
   e) sending said identification response to said first entity;
   f) verifying an acceptability of said identification response by said first entity;
   g) in response to said verifying, if said identification response is acceptable, signing said identification response using a digital signature by said first entity, thereby generating a signed response;
   h) sending said signed response to said identity registration authority;
   i) verifying a validity of said digital signature and said identification response in said signed response; and
   j) in response to said verifying, if said digital signature and identification response are valid, issuing said second electronic identity based on said first electronic identity.

2. The method of claim 1 further comprising a second entity by which said first entity digitally signs said identification response.

3. The method of claim 2 further comprising the steps of:
   checking if the information of said second entity is available using said identifier; and
   in response said checking, if said information is not available, inquiring the information of said second entity from said first entity.

4. The method of claim 2 or 3 wherein said second entity is in control of said first entity.

5. The method of claim 3 wherein said information of said second entity comprises one or more from a set containing a unique address of said second entity, a name of the holder of said second entity and previous identity or identities of said second entity.

6. The method of claim 1 further comprising the step of:
   establishing and encrypting a communication channel between said first entity and said identity registration authority to ensure confidential communication there between.

7. The method of claim 1 further comprising the step of:
   storing said issued second identity to a database of said identity registration authority.

8. The method of claim 1 further comprising the step of:
   storing said issued second identity to a database of the issuer of said first electronic identity.

9. The method of claim 1 further comprising the step of:
   combining said first and said second electronic identities to form a combined electronic identity; and
   storing said combined electronic identity to a database.

10. The method of claim 1 further comprising the step of:
    sending said issued second identity to said first entity.

11. The method of claim 1 further comprising the step of:
sending said issued second identity to a third party.

12. The method of claim 1 before the step of issuing said second identity further comprising the steps of:
checking if additional guarantees for ensuring a validity of the first electronic identity are to be acquired; and
in response to said checking, if additional guarantees are needed, acquiring additional guarantees.

13. The method of claim 1 further comprising the steps of:
adding a time stamp to said issued second identity; and
storing said time stamped second identity to a database of said registration authority.

14. The method of claim 1 further comprising the step of:
adding into said time stamp a expiration date of said second electronic identity.

15. The method of claim 1 further comprising, the steps of:
adding a notarization to said issued second identity; and
storing said notarized second identity to a database of said registration authority.

16. The method of claim 1 further comprising the steps of:
inquiring a further identifier code to be added into said signed identification response
receiving said identifier code at said registration authority; and
verifying the validity of said identifier code at said registration authority.

17. The method of claim 16 wherein said identifier code includes one or more from a set containing biometric code of said first entity, a predetermined character string, a fingerprint of a first entity's public key, random number, certificate, and a hash code of the shared secret between said first entity and said registration authority.

18. The method of claim 2 further comprising the steps of:
creating a first hash code from said request at said registration authority;
sending said first hash code to said second entity;
creating a second hash code from said identity request by said second entity; and
verifying a validity of said first hash code by comparing it to said second hash code before said step of signing said identification response.

19. The method of claim 1 or 2 before the step of issuing further comprising the steps of:
sending a confirmation message to the address specified in additional information of said first entity;
receiving a confirmation response to said confirmation message at said registration authority; and
verifying the validity of said confirmation response.

20. The method of claim 19 before the step of issuing further comprising the step of:
canceling said issuing of said second electronic identity if said confirmation response is not received in a predetermined time period.

21. The method of claim 1 wherein said request for issuing said second certificate for said entity is initiated by a third party.

22. The method of claim 2 wherein said request for issuing said second electronic identity for said first entity is initiated by said second entity.

23. The method of claim 2 wherein said request is digitally signed by said first entity before sending said request.

24. The method of claim 2 wherein said request is encrypted before sending said request.

25. The method of claim 1 further comprising the step of:
journalizing a log of all transactions during the issue process of said second electronic identity.

26. The method of claim 2 wherein said second entity is one of the following set including mobile terminal, mobile phone, personal computer, set-top box, smart card, tamper proof device, security token, software agent, pager, terminal equipment, and personal digital assistant (PDA).

* * * * *

UNITED STATES PATENT AND TRADEMARK OFFICE
CERTIFICATE OF CORRECTION

PATENT NO. : 7,020,778 B1
APPLICATION NO. : 09/489328
DATED : March 28, 2006
INVENTOR(S) : Jarmo Miettinen It is certified that error appears in the above-identified patent and that said Letters Patent is hereby corrected as shown below:

Please replace the Assignee information listed on the cover page with the following:

On title page item --(73) Assignee     Smarttrust Systems Oy
                                       Helsinki (Fl)--

Signed and Sealed this

Sixth Day of November, 2007

JON W. DUDAS
*Director of the United States Patent and Trademark Office*